Sept. 8, 1931.     W. A. ADAMS     1,822,260
COUPLING FOR ELECTRICAL FIXTURES
Filed Dec. 31, 1926
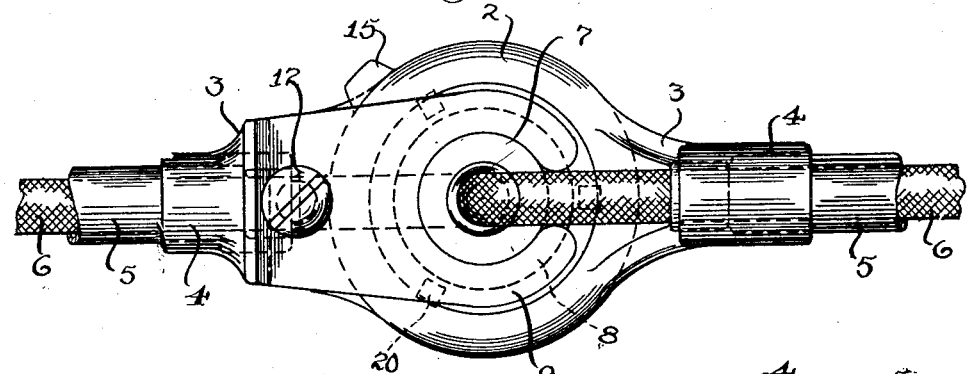
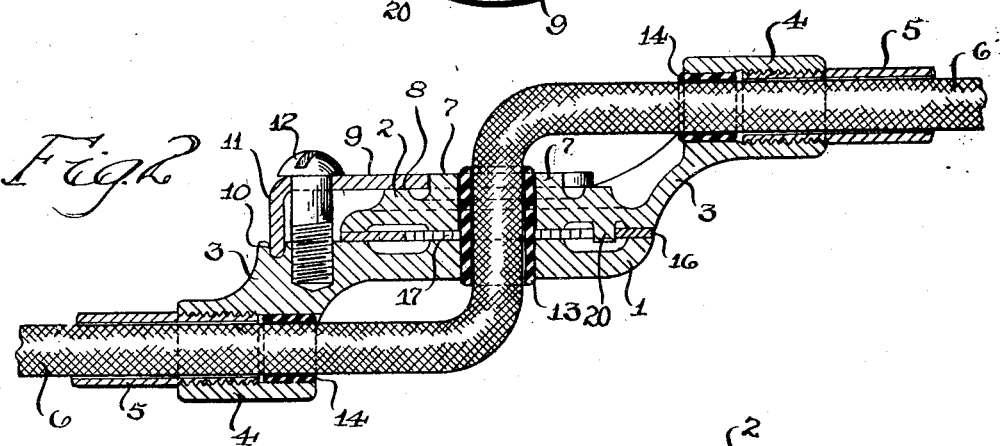
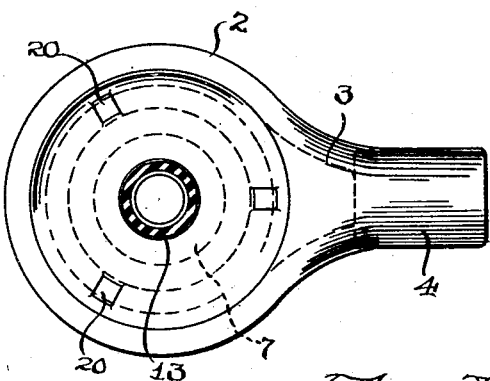
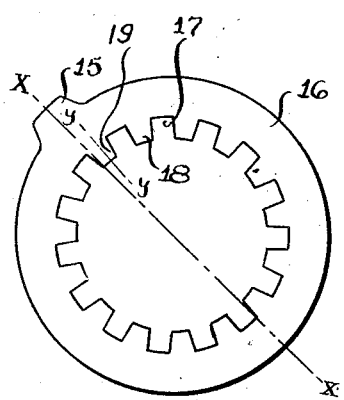
INVENTOR
Walter A. Adams
BY
H. H. Simms
HIS ATTORNEY Patented Sept. 8, 1931

1,822,260

UNITED STATES PATENT OFFICE

WALTER A. ADAMS, OF ROCHESTER, NEW YORK

COUPLING FOR ELECTRICAL FIXTURES

Application filed December 31, 1926. Serial No. 158,394.

The present invention relates to couplings for electrical fixtures and an object of the invention is to provide a coupling which will permit an electrical conductor to pass through the coupling member in such a manner that undue twisting strains on the conductor do not take place upon the relative turning of the two members. Another object of the invention is to provide a novel limiting means for limiting the relative movement between the two members of a coupling.

To these and other ends, the invention consists of certain parts and combinations of parts, all of which will be hereinafter described, the novel features being pointed out in the appended claims.

In the drawings:

Fig. 1 is a plan view of a coupling constructed in accordance with this invention;

Fig. 2 is a vertical section through the coupling;

Fig. 3 is a plan view of the abutting face of one of the coupling members; and

Fig. 4 is a plan view of one of the limiting rings forming part of the invention.

In the illustrated embodiment of the invention, the coupling comprises two coupling members 1 and 2 each in the form of a disk and each having an arm 3 extending laterally therefrom and provided with a sleeve 4 at its outer end in which a tube 5 for the conductor 6 is secured. The disk portions 1 and 2 are mounted to turn relatively one to the other and to this end the disk portion 2 has a cylindrical boss 7 projected from one face thereof to provide a cylindrical bearing, while surrounding the cylindrical bearing is an annular bearing surface 8 at right angles to the cylindrical bearing of the boss 7. With these two bearings a clamping and holding member 9 cooperates.

This clamping and holding member, in this instance, has an opening fitting the cylindrical wall of the boss 7 and a side rests upon the annular bearing 8 at right angles to said wall. An adjustable connection between this clamping and holding member and the coupling member 1 is preferably provided in order that the two members may be drawn together. To this end the clamping member 1 is provided with a recess 10 in which a laterally turned portion 11 on the clamping and holding member 9 has a rocking bearing. A set screw 12 passes through the clamping holding member between this rocking bearing and the point where the clamping and holding member engages the coupling member 2.

Each of the clamping members 1 and 2 has a central opening concentric with the axis of turning between the two coupling members, and an insulating sleeve 13 is secured to the coupling member 1 by a drive fit and extends loosely through the coupling member 2, projecting above and below both members of the coupling to a slight degree. The conductor 6 which passes through the conductor tubing 5 and through insulating sleeves 14 in the sleeves 4 also passes through the central insulating sleeve 13. It is apparent that relative turning between the two tubes will produce only a slight twisting action in the conductor 6 due to the fact that the conductor passes through the coupling in line with the axis of turning between the two coupling members.

In order to limit the relative swinging between the two members, the coupling member 2 carries a stop 15 which is adapted to cooperate with the bolt or screw 12 in order to limit the relative movement between the members. This stop is adjustable and to this end it is mounted on a flat ring 16, this ring having its inner periphery provided with notches or recesses 17 formed with equidistantly spaced teeth or projections 18 between them. These teeth are so arranged that one tooth 19 is nearest to the line $x$—$x$ through the center of the stop lug 15, but the center $y$—$y$ of such tooth is to one side of the center line $x$—$x$, whereby the reversal of the ring makes it possible to obtain twice the number of adjustments for such ring as could be obtained if the ring were not reversible and had not this tooth arrangement. The stop ring 16 cooperates with equi-distantly arranged lugs 20, in this instance three, projected downwardly from the inner face of the member 2 and adapted to fit in the recesses of the stop ring 16. The ring is held between the two members 1 and 2 and maintained in this position by the combined clamping and pivoting member 9.

From the foregoing it will be seen that there has been provided a coupling for electric fixtures in which two coupling members are pivotally connected in such a manner that a conductor cord may pass centrally through the axis of turning between the coupling member, thereby permitting the relative swinging of the two members without imposing any material twisting strain on the cord. Novel means is employed for insulating the conductor cord from the two fixtures from the point where the cord passes through the axis of the coupling. In connection with the coupling there is provided a movable limiting means which is held in interlocking position between the two members of the couplings and adjustably connects with one of the coupling members in such a manner that a maximum number of adjustments may be obtained and, at the same time, the construction is such that it may be inexpensively manufactured.

This application is a continuation in part of an application filed by me on June 16, 1925, Serial No. 37,578.

What I claim as my invention and desire to secure by Letters Patent is:

1. The combination of two coupling members pivotally connected for relative turning, one of said members being provided with a plurality of projections arranged concentric with the axis of turning, a stop provided on the other member, and a stop ring having a stop lug extending from its outer periphery to cooperate with the stop on said other member, said stop ring having its inner periphery provided with a plurality of spaced teeth forming recesses between them, the tooth and the recess on the inner periphery of the stop ring, next to a diametric line passing through the ring and the center of the stop lug, having their centers on opposite sides of said diametric line, the stop ring being reversely connectable with the projections on the first mentioned coupling.

2. The combination with two pivotally connected coupling members, of a stop ring positioned between the members and having recesses in its inner periphery, lugs projecting from one of the coupling members into said recesses for holding the stop ring against turning relatively to the said coupling member, a stop lug projecting from the outer periphery of the stop ring, and a stop on the other coupling member for engagement by the stop lug of the stop ring.

WALTER A. ADAMS.